(12) United States Patent
Konigsburg et al.

(10) Patent No.: US 7,487,334 B2
(45) Date of Patent: Feb. 3, 2009

(54) BRANCH ENCODING BEFORE INSTRUCTION CACHE WRITE

(75) Inventors: Brian R. Konigsburg, Austin, TX (US); Hung Qui Le, Austin, TX (US); David Stephen Levitan, Austin, TX (US); John Wesley Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/050,350

(22) Filed: Feb. 3, 2005

(65) Prior Publication Data

US 2006/0174095 A1 Aug. 3, 2006

(51) Int. Cl.
*G06F 9/34* (2006.01)

(52) U.S. Cl. .................. 712/213; 712/237; 712/239; 712/233

(58) Field of Classification Search ................. 712/239; 395/586
See application file for complete search history.

(56) References Cited

U.S. PATENT DOCUMENTS

| | | | | |
|---|---|---|---|---|
| 3,577,189 | A * | 5/1971 | Cocke et al. ............... | 712/219 |
| 4,926,323 | A * | 5/1990 | Baror et al. ................ | 712/238 |
| 5,088,030 | A * | 2/1992 | Yoshida ..................... | 712/237 |
| 5,592,637 | A * | 1/1997 | Matsuo ...................... | 712/237 |
| 5,649,145 | A * | 7/1997 | Matsuo et al. ............. | 711/213 |
| 5,761,490 | A * | 6/1998 | Hunt ........................... | 712/239 |
| 5,828,895 | A * | 10/1998 | Chan et al. ................... | 712/23 |
| 5,845,587 | A * | 12/1998 | Ditonto .................... | 108/50.01 |
| 5,848,268 | A * | 12/1998 | Matsuo ...................... | 712/233 |
| 5,987,585 | A * | 11/1999 | Motoyama et al. .......... | 712/1 |
| 6,167,506 | A * | 12/2000 | Witt ........................... | 712/213 |
| 6,243,805 | B1 * | 6/2001 | Mahurin ..................... | 712/233 |
| 6,279,106 | B1 * | 8/2001 | Roberts ..................... | 712/239 |
| 6,360,317 | B1 * | 3/2002 | Mahalingaiah et al. ...... | 712/233 |
| 6,367,001 | B1 * | 4/2002 | Witt ........................... | 712/205 |
| 6,457,117 | B1 * | 9/2002 | Witt ........................... | 712/213 |
| 6,496,923 | B1 * | 12/2002 | Gruner et al. .............. | 712/213 |

(Continued)

FOREIGN PATENT DOCUMENTS

EP 381444 A2 * 8/1990

OTHER PUBLICATIONS

Patterson et al., Computer Organization and Design, 2005, Morgan Kaufmann, 3rd, pp. 330-340.*

*Primary Examiner*—Matt Kim
*Assistant Examiner*—Cheng-Yuan Tseng
(74) *Attorney, Agent, or Firm*—Duke W. Yee; Diana L. Roberts-Gerhardt; Gerald H. Glanzman

(57) ABSTRACT

Method, system and computer program product for determining the targets of branches in a data processing system. A method for determining the target of a branch in a data processing system includes performing at least one pre-calculation relating to determining the target of the branch prior to writing the branch into a Level 1 (L1) cache to provide a pre-decoded branch, and then writing the pre-decoded branch into the L1 cache. By pre-calculating matters relating to the targets of branches before the branches are written into the L1 cache, for example, by re-encoding relative branches as absolute branches, a reduction in branch redirect delay can be achieved, thus providing a substantial improvement in overall processor performance.

1 Claim, 3 Drawing Sheets

U.S. PATENT DOCUMENTS

| | | |
|---|---|---|
| 6,598,154 B1 * | 7/2003 | Vaid et al. .................... 712/237 |
| 6,735,681 B2 * | 5/2004 | Asano et al. ................. 711/204 |
| 6,816,962 B2 * | 11/2004 | Augsburg et al. ........... 712/226 |
| 6,842,846 B2 * | 1/2005 | Chen et al. .................. 712/207 |
| 6,941,489 B2 * | 9/2005 | DeLano ....................... 714/10 |
| 6,948,053 B2 * | 9/2005 | Augsburg et al. ........... 712/233 |
| 7,010,675 B2 * | 3/2006 | Karim et al. ................. 712/235 |
| 2003/0163677 A1 * | 8/2003 | Augsburg et al. ........... 712/233 |

* cited by examiner

BRANCH ENCODING BEFORE INSTRUCTION CACHE WRITE

BACKGROUND OF THE INVENTION

1. Technical Field

The present invention relates generally to the data processing field and, more particularly, to a method, system and computer program product for determining the targets of branches in a data processing system.

2. Description of Related Art

A common objective when designing a data processing system is to minimize the time required to transfer data from one location to another. Among the factors that increase the time required to transfer data ate delay periods during which one component in a data path sits idly by while waiting for another component in the path to complete necessary actions with respect to the data.

One area in which a delay is encountered is in determining the targets of branches. In particular, in known processor designs, predicting and calculating the targets of branches is performed by an adder in a fetch unit of the processor as part of the fetch line; and such a design inherently results in a delay, referred to as a "branch redirect delay", in determining the targets of the branches. The delay also affects the resolution of branches (i.e., the determination of whether a branch is taken or not taken), and, in general, has a direct and negative impact on overall processor performance. Any improvement that can be made to the branch redirect delay will provide a substantial performance boost to processors.

Accordingly, it would be advantageous to provide a mechanism that provides for a reduction in the branch redirect delay in a data processing system.

SUMMARY OF THE INVENTION

The present invention provides a method, system and computer program product for determining the targets of branches in a data processing system. A method for determining the target of a branch in a data processing system according to the invention comprises performing at least one pre-calculation relating to determining the target of the branch prior to writing the branch into a Level 1 (L1) cache to provide a pre-decoded branch, and then writing the pre-decoded branch into the L1 cache.

By pre-calculating matters relating to the targets of branches before the branches are written into the L1 cache, for example, by re-encoding relative branches as absolute branches, a reduction in branch redirect delay can be achieved, thus providing a substantial improvement in overall processor performance.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
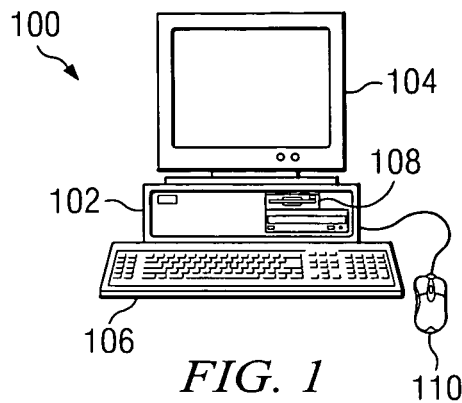
FIG. 1 is a pictorial representation of a data processing system in which the present invention may be implemented according to a preferred embodiment of the present invention.

With reference now to the figures and in particular with reference to FIG. 1, a pictorial representation of a data processing system in which the present invention may be implemented is depicted according to a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer™ computer or IntelliStation™ computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
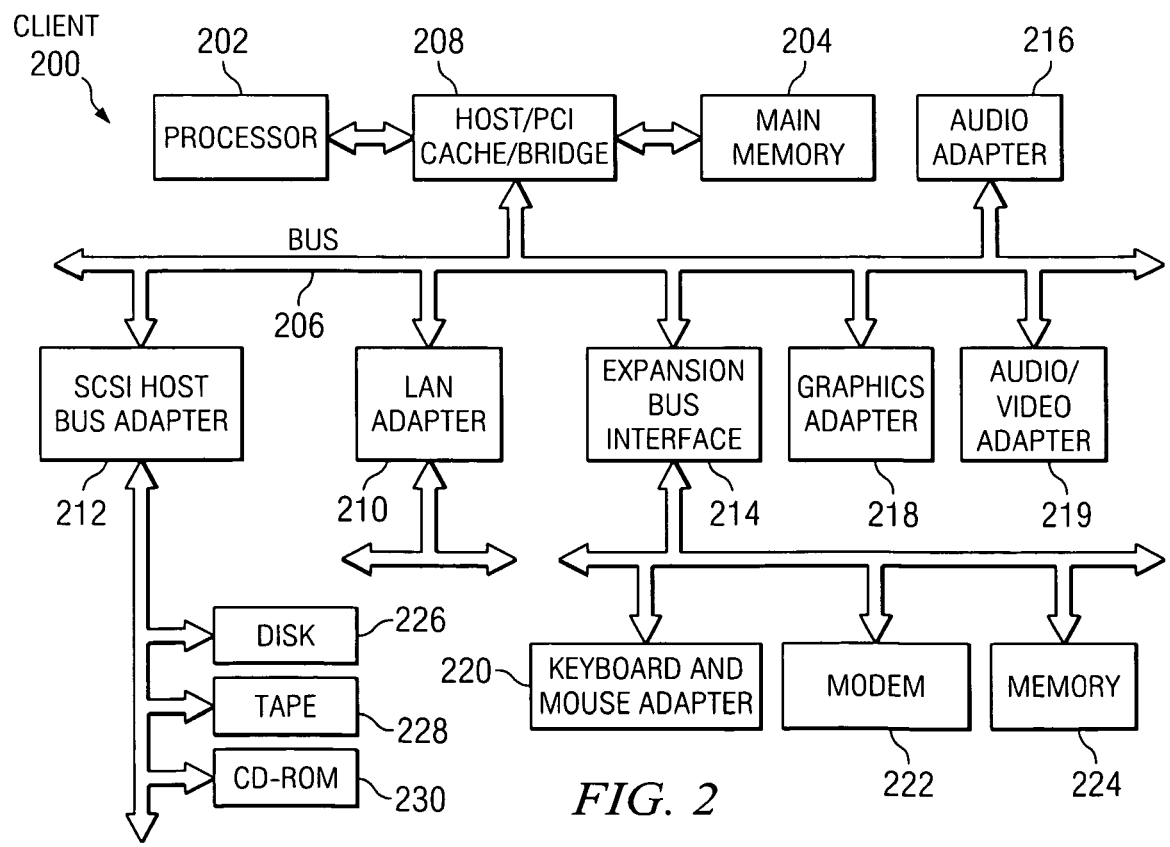
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as WINDOWS XP operating system, which is available from Microsoft Corporation. An object oriented programming system such as Java may run in conjunction with the operating system and provides calls to the operating system from JAVA programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory. (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by a processor, such as processor 202 using computer implemented instructions, which may be located in a memory such as, for example, main memory 204, memory 224, or in one or more peripheral devices 226-230.

According to the present invention, a method, system and computer program product are provided for determining the targets of branches in a data processing system. In particular, the present invention provides a mechanism for reducing the delay, referred to as a "branch redirect delay" in determining the target of branches that are written into a Level 1 (L1) cache in a processor in a data processing system.

According to the invention, a pre-decode logic unit is provided in the path of a branch to perform at least one pre-calculation relating to determining the target of the branch prior to writing the branch into the L1 cache to provide a pre-decoded branch, and the pre-decoded branch is then written into the L1 cache. By performing at least one calculation with respect to the branch before writing the branch into the L1 cache, the at least one calculation can be performed when the branch is not waiting to be fetched, thus providing a reduction in branch redirect delay.

Figure 3:
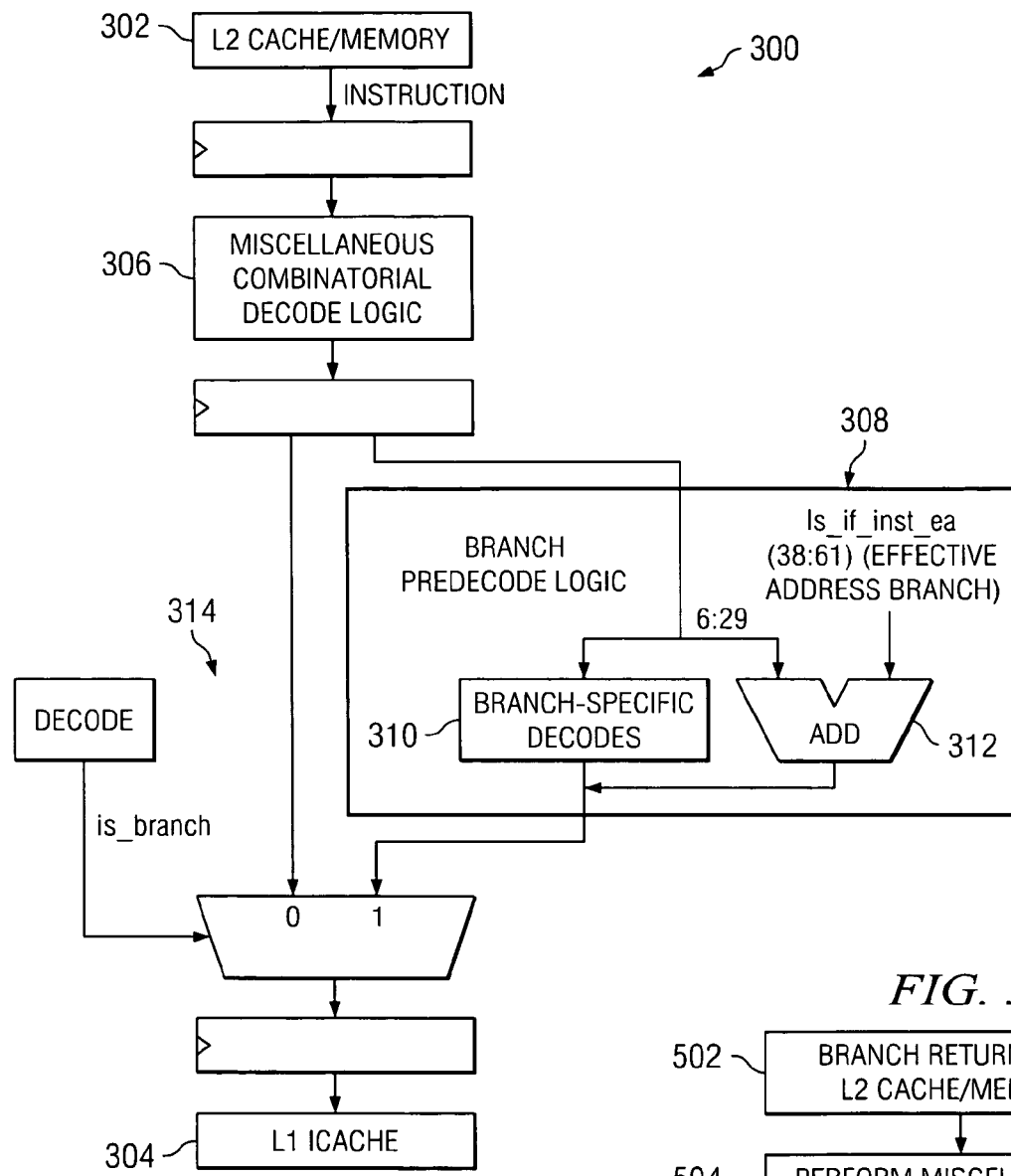
FIG. 3 is a block diagram that illustrates a system for determining the target of a branch in a data processing system according to a preferred embodiment of the present invention.

FIG. 3 is a block diagram that illustrates a system for determining the target of a branch in a data processing system according to a preferred embodiment of the present invention. The system is generally designated by reference number 300, and provides a path for the flow of a branch returning from Level 2 (L2) cache/memory 302 and being written into L1 Icache 304 of a processor of the data processing system. System 300 includes combinatorial decode logic unit 306 that performs miscellaneous combinatorial decoding of the branch. After decoding by logic unit 306, the branch flows through branch pre-decode logic unit 308. Branch pre-decode logic unit 308 includes branch specific decode unit 310 and adder 312. Branch specific decode unit 310 includes combinatorial logic that is used to determine attributes of the branch, such as if the branch is relative or absolute, if the branch causes any updates to architected registers, and any other decodes that may be useful for the microarchitecture of the processor. As will be described more fully hereinafter, pre-decode logic unit 308 is capable of performing one or more pre-calculations relating to determining the target of the branch.

After the one or more pre-calculations are performed by branch pre-decode logic unit 308, the now pre-decoded branch is marked with a special pre-decode bit by marker unit 314 to indicate that it is a branch unit instruction. The pre-decode bit is stored in L1 Icache 304 along with the instruction.

There are several types of pre-calculations that can be performed in branch pre-decode logic unit 308 to reduce branch redirect delay. Among the pre-calculations that can be performed include if the branch updates an architected register (such as a link register used for procedure calls), any branch prediction "hint" decodes built into the opcode to aid branch prediction, and parity calculation on the bits of the branch target address stored in the branch opcode. A pre-calculation that can result in a very substantial reduction of branch redirect delay, however, is to take branches that are relative and re-encoding the branches as absolute branches. This re-encoding is possible because the effective address (ea) of a relative branch is known when it returns from L2 cache/memory 302, and performing the add of the ea to the relative offset of the branch target removes a substantial amount of necessary calculation from the branch redirect path.

In general, branches go through a variety of calculations depending on the particular branch type. There are three basic classes of branches:

1. Those that get their target from an architected register—XL form;
2. Relative branches—B form (14 bit displacement) or I form (24 bit displacement);
3. Absolute branches—B form (14 bit displacement) or I form (24 bit displacement).

Table 1 identifies how an original 32-bit opcode (operation code) is recoded into particular fields. The largest calculation is the computation of the branch target ea. For branches that include the branch target (either relative or absolute) in the original opcode, the target ea of the branch is calculated and re-encoded into the new branch. For absolute branches, the calculation is trivial because the address will be unchanged. For relative branches, however, the calculation involves passing the low 24 bits of the ea to pre-decode logic unit 308 to enable the relative address of a branch to be transformed to an absolute address.

TABLE 1

| Instructive Opcode | Form | B Form | XL Form | Description |
| --- | --- | --- | --- | --- |
| 0 | Branch | Branch | Branch | Used to differentiate a branch from other branch unit instructions |
| 1 2:3 | Displacement parity Type | Displacement parity Type | Unused Type | D0 - Unconditional branch (24 bit Displacement) 01 - Other (14 bit displacement) 10 - bclr 11 - bcctr |
| 4:5 | Target MSB handling | Target MSB handling | Target MSB handling | How to handle sign-extension, ect. of most significant bit of the branch target; 00 - Use instruction address (0's in upper bits) 01 - Use incremented instruction address (carry out to upper bits) 10 - Use sign extended displacement (F's in upper bits) 11 - Use decremented instruction address (−1 to upper bits) |
| 6:10 | Branch target (0:4) | BO field | BO field | 24-bit displacement branches start their destination ea here; other branch types just pass through the original opcode |
| 11:15 | Branch target (5:9) | BI field | BI field | 24-bit displacement branches continue their destination ea here; other branch types just pass through the original opcode |
| 16:29 | Branch target (10:23) | Branch target (0:13) | unused | 24-bit displacement lowest order bits, 14-bit displacement complete branch target |
| 30 | unused | unused | unused | spare |
| 31 | Link bit | Link bit | Link bit | Pass through from original opcode |

Parity is calculated on the computed portion of the branch target to simplify parity generation on the target ea after the branch is read out of the L1 cache. Also, bits 4:5 of the opcode are encoded to identify how the upper order bits of the branch target should be manipulated. For example, if there was a carry-out from the offset calculation done by the 24-bit adder, those bits are set to '01' to tell the redirect logic to do an increment on the upper-order bits of the ea when calculating the full target address.

Figure 4:
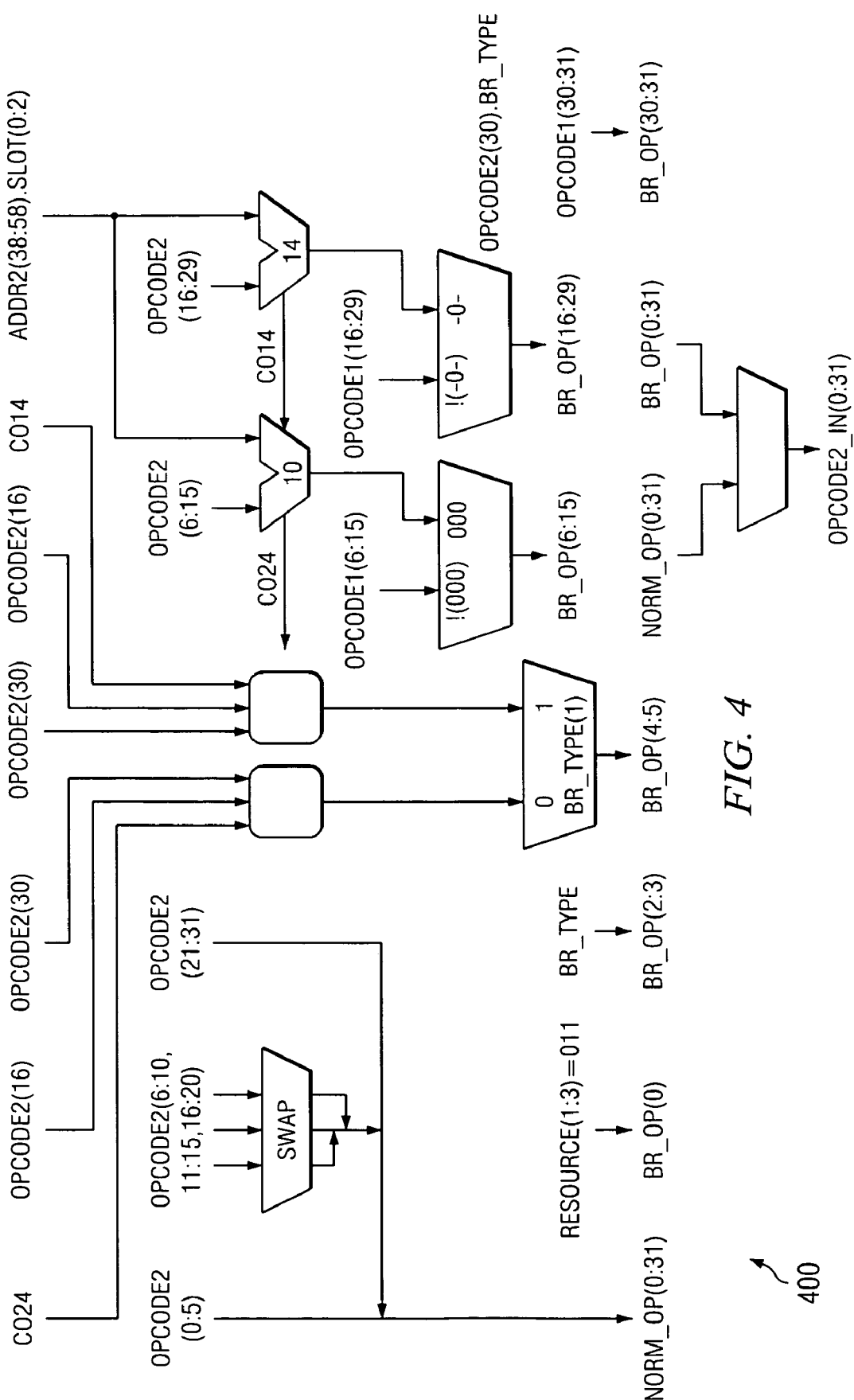
FIG. 4 is a logic diagram that graphically illustrates how an original 32-bit opcode is recoded into particular fields according to a preferred embodiment of the present invention.

FIG. 4 is a logic diagram that graphically illustrates how an original 32-bit opcode is recoded into particular fields according to a preferred embodiment of the present invention. In particular, FIG. 4 is a logic diagram in which logic 400 on the right side of the diagram generates br_op that corresponds to the values in Table 1.

Figure 5:
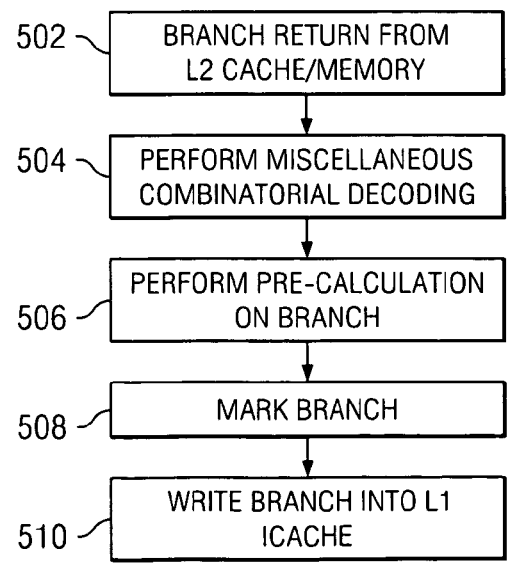
FIG. 5 is a flowchart that illustrates a method for determining the target of a branch in a data processing system according to a preferred embodiment of the present invention.

FIG. 5 is a flowchart that illustrates a method for determining the target of a branch in a data processing system according to a preferred embodiment of the present invention. The method is generally designated by reference number 500 and begins by a branch instruction returning from an L2 cache/memory along a data path to an L1 Icache (Step 502). After miscellaneous combinatorial decoding is performed on the branch instruction (Step 504), the branch instruction is directed through a branch pre-decode logic unit which performs at least one pre-calculation relating to determining the target of the branch (Step 506). The now pre-decoded branch is then marked to indicate that it is a branch unit instruction (Step 508) and the branch is written into the L1 Icache (Step 510).

In general, the present invention achieves a reduction in branch redirect delay by performing at least one pre-calculation relating to determining the target of a branch before the branch is written into an L1 Icache. Although performing pre-calculations before the branch is written into the L1

Icache may add some delay to the L2 latency of instructions, adding such a delay has much less of an impact on the overall performance of the processor than adding the delay to the branch redirect path. This is because of the benefit of instruction prefetching allowing some of the calculations to be done when the instructions are not waiting to be fetched. In addition, once the instructions are in the instruction cache, there is no additional performance penalty.

The present invention also permits a reduction in any delay that exists in the resolution of branches (i.e., the determination of whether a branch is taken or not taken) which can also have a direct and negative impact on overall processor performance.

The present invention thus provides a mechanism for determining the targets of branches in a data processing system that provides a reduction in branch redirect delay. According to the invention, at least one pre-calculation relating to determining the target of a branch is performed prior to writing the branch into a Level 1 (L1) cache to provide a pre-decoded branch, and the pre-decoded branch is then written into the L1 cache. By pre-calculating matters relating to the targets of branches before the branches are written into the L1 cache, for example, by re-encoding relative branches as absolute branches, a significant reduction can be achieved in the branch redirect delay, thus providing an overall improvement in processor performance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining a target of a branch instruction, comprising:

receiving a branch instruction from a Level 2 cache;

performing combinatorial decoding on the branch instruction;

directing the branch instruction on which the combinatorial decoding has been performed to a pre-decode logic unit;

determining, using combinatorial logic of the pre-decode logic unit, a class of the branch instruction from a plurality of classes of branch instructions, wherein the plurality of classes of branch instructions include branch instructions that get their target from an architected register, relative branch instructions and absolute branch instructions;

in response to determining that the class of the branch instruction is a relative branch instruction, performing pre-calculations by the pre-decode logic unit to create a pre-decoded branch, wherein the pre-calculations comprise re-encoding pre-calculations for re-encoding a relative address of the relative branch instruction into an absolute address, branch prediction decode pre-calculations and parity pre-calculations, and wherein the re-encoding the relative address into the absolute address includes calculating an effective address of the target;

marking the pre-decoded branch with a pre-decode bit to indicate that the pre-decoded branch is a branch unit instruction; and writing the pre-decoded branch with the pre-decode bit into a Level 1 cache.

* * * * *